United States Patent Office 3,004,784
Patented Oct. 17, 1961

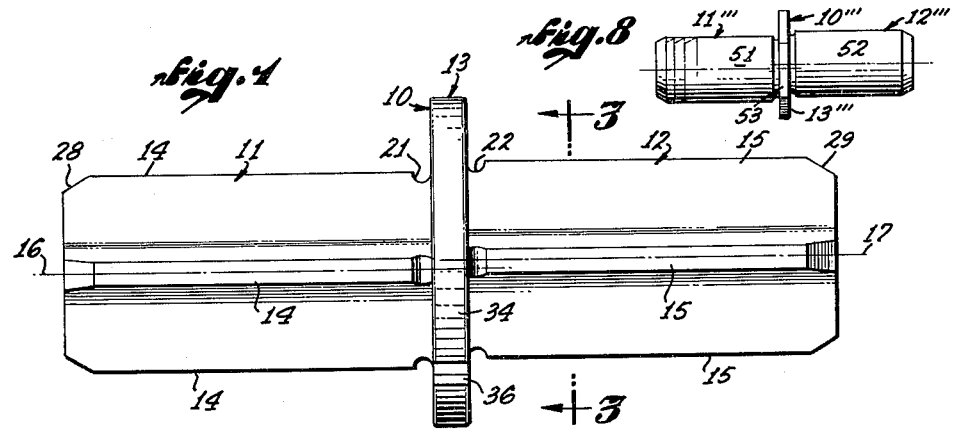
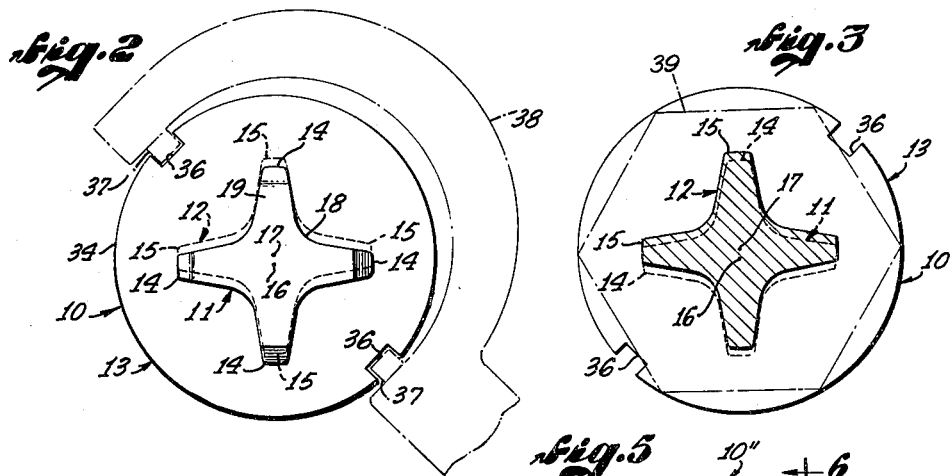
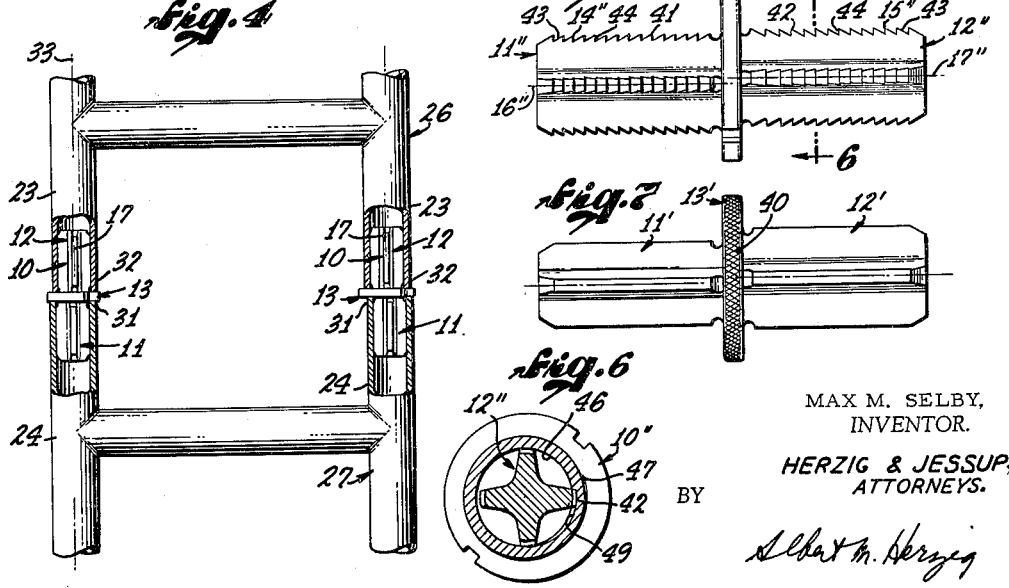
Oct. 17, 1961     M. M. SELBY     3,004,784
COUPLING PIN
Filed July 20, 1959
MAX M. SELBY,
INVENTOR.
HERZIG & JESSUP,
ATTORNEYS.

3,004,784
COUPLING PIN
Max M. Selby, Los Angeles, Calif., assignor to Tubular Structures Corp. of America, Los Angeles, Calif., a corporation of California
Filed July 20, 1959, Ser. No. 828,418
12 Claims. (Cl. 287—2)

This invention relates to coupling pins and more particularly to a coupling pin for joining sections of tubing or pipes as in tubular structures such as ladders, scaffolds, or the like.

While it is submitted that coupling pins of varying types have been heretofore employed to join a pair of conduits or pipes, they have been most effective and practical only in use of joining a single pair of such tubular structures. However, when a structure, such as a ladder or scaffolding, consists of at least one pair of tubular sections to be joined and the tubular sections are rigidly and non-adjustably securing in spaced relationship, such as two or more tubular posts or legs of a scaffold structure requiring extension by the addition of a similar structure having an equal number of legs or posts, it has been found that because of manufacturing tolerances, of not only the tubes, but of the spacing between the tubes, such legs or posts rarely exactly match and are therefore difficult or impossible to join by the more conventional pin means.

Because of such tolerances, it has been heretofore impractical to securely fasten such structures together by pin means, inasmuch as provision of pins which have a tight fit with the interior of the legs or posts, cannot be used for tubular posts which are mismatched. Furthermore, the structure when joined by loose pins cannot be lifted without causing the legs to disjoin unless other means such as threaded connections, transverse pins or set screws are employed.

It is therefore an object of this invention to provide a new and improved coupling pin for coupling tubular members of tubular structures such as ladders, scaffolding, or the like.

It is another object of this invention to provide a new and improved coupling pin which uniquely couples tubular structures even though tubular legs or posts of the structures are mismatched due to manufacturing tolerances.

It is a further object of this invention to provide a new and improved coupling pin which provides means by which the coupling pin may be easily and readily inserted into the tubular portions of stacked structures, yet which provides means by which such structures may be releasably locked together.

A still further object of this invention is to provide a new and improved coupling pin having tool engaging means for manipulation thereof.

Yet another object of this invention is to provide a coupling pin of the character described which can be employed to couple tubular members of varying inner diametrical dimensions.

Yet another object of this invention is to provide a new and improved coupling pin of the character described, which is economical to manufacture and capable of mass production.

Within these and other objects which will be more apparent from the following description, drawing and appended claims, this invention provides a new and improved coupling pin having a pair of elongated pin members in end-to-end relationship and an enlarged flange intermediate thereof. Each pin member is provided with a plurality of outer arcuate surfaces having a common circumference described about the longitudinal axis of each member, the axis of one of the pin members being substantially parallel to the axis of the other pin member and laterally spaced therefrom whereby the pin members may be inserted into tubular legs or posts of a tubular structure to couple the structures in stacked relationship and by rotation of the pin means, adjust the legs and posts of the structures to a mean distance between the legs regardless of accumulation of manufacturing tolerances. The coupling pin includes tool-engaging means on the surface of the flange thereby to facilitate rotation of the pin to locate the longitudinal axes thereof in a position to receive adjacent tubular structures. The invention further includes means on the surface of each pin whereby as the coupling pin is rotated, the inner surfaces of the tubular legs or posts are gripped by the pin to securely fasten one structure to another whereby both structures may be lifted or carried in assembled relationship.

A general object of this invention is to provide a new and improved coupling means as hereinafter described which overcomes disadvantages of prior coupling means heretofore intended to accomplish generally similar purposes.

In the drawings:
FIGURE 1 is a side view, in elevation, of a preferred embodiment of a coupling pin designed and constructed in accordance with this invention.
FIGURE 2 is an end view thereof, as viewed from the left side of FIGURE 1;
FIGURE 3 is a vertical cross-sectional view as taken on a line 3—3 of FIGURE 1;
FIGURE 4 is a side-view, in elevation, of a pair of tubular structures illustrated in stacked relationship and coupled by the coupling pin of FIGURE 1, with parts broken away for greater clarity;
FIGURE 5 is a side-view, in elevation, of another embodiment of the coupling pin of the instant invention;
FIGURE 6 is a vertical cross-sectional view as taken along a line 6—6 of FIGURE 5, illustrating the relationship of the coupling pin of FIGURE 5 to a tubular member;
FIGURE 7 is a side-view, in elevation, of a further modified embodiment of this invention; and
FIGURE 8 is a side-view, in elevation, of a still further modified embodiment.

Referring more particularly to the drawings, there is shown, by way of illustration, but not of limitation, a preferred embodiment of a coupling pin, generally referred to by the numeral 10, illustrated in FIGURES 1–4 and additional embodiments illustrated in FIGURES 5, 7 and 8 respectively, designed and constructed in accordance with this invention.

The preferred embodiment of coupling pin 10, in FIGURES 1–4, comprises a pair of pin members 11 and 12 which are preferably integral with an enlarged flange 13 intermediate thereof or optionally secured at their inner ends to the flange as by welding, or the like. Each pin member 11, 12, includes a plurality of outer arcuate surfaces 14 and 15, respectively, having a common circumference described about their individual longitudinal axes, 16 and 17, respectively. The surfaces 14 and 15 may be accomplished by forming a plurality of flutes or grooves 18, thus forming equi-angularly spaced radial ribs 19 therebetween.

As best seen in FIGURES 1–3 the axis 16 of the pin member 11 is substantially parallel to the axis 17 of the tubular member 12, and is laterally spaced therefrom a predetermined distance to offset the pin member 11 from the pin member 12. It has been found in practice that an offset of approximately 1/16 of an inch is highly practical for the purpose of the coupling pin.

The outer surfaces 14 and 15 are relieved as by transverse grooves 21 and 22, respectively, adjacent the flange 13, thus facilitating insertion of a pin members 11 and 12 into tubular members 23 and 24, respectively, of tubular structures indicated at 26 and 27, as will be hereinafter described. To facilitate initial insertion into tubular members like 23 and 24, the pin members 11 and 12 each are chamfered at their outer ends as indicated at 28 and 29, respectively.

To couple structures like 26 and 27, of FIGURE 4, a coupling pin 10 of FIGURE 1 is installed in each tubular member 24 of the lowermost structure 27 by insertion of the pin members 11 into the open upper ends 31 until the flanges 13 of the coupling pins rest upon the upper ends 31. Subsequently, the tubular structure 26 is elevated and placed upon the pin members 10 with the lower ends 32 of the tubular members 23 in proximity of the pin members 12 extending upwardly from the members 24. With the structure 26 in this position, one of the tubular members 23 is engaged with the uppermost end of a tubular member 12 of one of the coupling pins 10, after which another coupling pin 10 of another leg 24 is rotated by means of a force applied to its flange 13 until the axis 17 thereof coincides with the axis 33 of the other leg 23, after which the legs 23 are telescoped over the pin members 12. Depending on the amount of tolerance build-up, i.e., the dimensional difference between the spacing of the tubular members 24 and 23, one or all of the coupling pins 10 are rotated until the axes thereof are positioned to enable slipping of the tubular members 23 thereover.

To facilitate rotation of the coupling pins 10, the outer surface 34 of the coupling pin 10 is provided with one or more notches 36 to receive pins or detents 37 of a spanner wrench 38 indicated in broken lines in FIGURE 2. The outer surface of the flange 13 may be optionally provided with knurling as indicated at 40 in FIGURE 7 on the outer surface of a flange 13' of the embodiment illustrated in that figure, or if preferred, the flange may be formed with a non-round configuration, as indicated in the broken lines 39, in FIGURE 3, for engagement with a conventional adjustable or non-adjustable wrench.

The instant embodiment of FIGURE 1 is illustrated in which the arcuate surfaces 14 and 15 are constructed with equal radial dimensions for use with tubular structures having matching tubular leg members 23 and 24 of equal internal diameters. If it is desired to couple tubular structures like 26 and 27 having tubular members 23 and 24 of unlike diametrical dimension, the coupling pin of FIGURE 7 illustrates a modification in which the pin members 11' and 12' are of unlike diametrical dimension corresponding to the unlike diametrical dimension of the tube members desired to couple.

In the embodiment of FIGURE 7, like parts, corresponding to the embodiment of FIGURE 1, are referred to by like numbers which are primed.

The structures 26 and 27 may be locked to each other in coupled relationship by additional rotation of the flanges 13 after the structures 26 and 27 are coupled. By relocating the position of the axes 16 and 17 of the pin members 11 and 12 relative to each other, selective surfaces 14 and 15 thereof are caused to jam against selective inner surfaces of the tubular members 23 and 24 causing them to bind sufficiently to lock the structures 26 and 27 together in a releasable manner, whereby the stacked structures may be lifted, if desired, by lifting on the upper structure. To release the locking action, in order to disassemble the structures 26 and 27, the coupling pins 10 are again rotated in a counter direction to locate the axes thereof in a position in which the structure 26 may be easily and readily lifted from the pins 10.

Referring to FIGURES 5 and 6, another modification of the coupling pin of the instant invention is illustrated wherein the numeral 10" designates the coupling pin of the instant modification and parts thereof corresponding to parts of the previous embodiments are referred to by like numbers which are double primed. The coupling pin 10" comprises a pair of pin members 11" and 12" having outer surfaces 14" and 15" respectively, each group of which is formed on a common circumference described about their individual longitudinal axes 16" and 17", the axes being substantially parallel to each other and laterally spaced to offset the pin members.

In this instant embodiment, the outer surfaces 14" and 15" are provided with transverse arcuate teeth, 41 and 42 respectively, which are preferably in ratchet configuration, having outwardly sloping angular faces 43 and substantially vertical inwardly facing faces 44. As best seen in FIGURE 6, as a coupling pin 10" is rotated to bind, for example the surface 15" into the inner surface 46 of a tubular leg or post 47, to secure the post to another similar post, the teeth 42 bite into the internal surface 46, as indicated at 49, whereby the vertical faces 44 resist the withdrawal of the pin member 12" and similarly, the pin member 11" from a tubular member similar to the tubular member 47. To release the tubular members like 47, the coupling pin 10" is rotated in an opposite direction to withdraw the teeth 42 from the cut 49 made within the tube 47, after which the pin member 12" may be easily withdrawn.

Although the pin members 11 and 12 and their corresponding pin members of the previously described embodiments, are provided in fluted form, having flutes 18 and radial members 19, previously described, whereby relatively narrow surfaces 14 and 15 are formed on the pin members, the invention is not to be restricted to such construction but may be provided in the configuration of the embodiment illustrated in FIGURE 8. In the instant embodiment, a coupling pin, generally referred to by the numeral 10''' is provided with a pair of pin members 12''' and 11''' which have cylindrical outer surfaces 51 and 52 respectively, whose longitudinal axes are offset, as previously described in the previous embodiments. The cylindrical surfaces 51 and 52 may be practically used on a coupling pin employed to couple tubes which have comparatively smooth interiors, whereas the fluted design is preferable and more practical for use with the majority of tubular construction wherein tubes have inner surfaces tending to be irregular.

Additionally, in FIGURE 8, a non-round outer configuration is illustrated for the flange 13''' wherein flats 53 facilitate gripping of the flange 13''' by a wrench, or the like.

While I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and methods.

What I claim and desire to secure by letters patent is:

1. A coupling pin comprising: a pair of elongated pin members and an abutment means intermediate thereof, each of said pin members having a longitudinal axis and a plurality of outer peripheral surfaces about its longitudinal axis, the axis of one of said pin members being substantially parallel to the axis of the other of said pin members and transversely spaced therefrom, said pin members being insertable into the ends of a pair of tubular members having parallel and transversely spaced axes for coupling the tubular members, said pins being rotatable so as to align the axes of said pin members with the axes of the tubular members.

2. A coupling as defined in claim 1 wherein the radial dimensions of said peripheral surfaces of each of said pin members are equal for coupling tubular members of substantially equal diametrical dimension.

3. A coupling as defined in claim 1 wherein the radial dimension of said peripheral surface of one of said pin members is greater than the corresponding dimension of the other of said pin members for coupling tubular members of unequal diametrical dimension, each being substantially complementary in size to one of said pin members.

4. A coupling pin as defined in claim 1 wherein said abutment means includes an outer surface and tool-engaging means on said outer surface for facilitating rotation of the coupling pin relative to the tubular members.

5. A coupling pin comprising: a pair of elongated cylindrical pin members secured together in end-to-end relationship, each having a longitudinal axis, the axis of one of said pin members being parallel to the axis of the other said pin members and transversely spaced therefrom, each said pin members being insertable into one end of one of a pair of tubular members having fixed, parallel, transversely spaced axes and rotatable so as to coincide the axes of said pin members with the axes of said tubular members for coupling the tubular members in contiguous aligned relationship.

6. A coupling pin as defined in claim 5 including means on said pin members and responsive to rotation of said pin members relative to the tubular members for gripping the internal surface of the tubular member, said means comprising longitudinally-spaced teeth on the outer surfaces of said pin members.

7. A coupling as defined in claim 6 wherein each of said teeth includes an outwardly-facing angular face and an inwardly-facing substantially-vertical face, said angular face being directed towards the outer end of each pin member for facilitating entry of said pin members into tubular members and said vertical face being substantially at right angles to the axes of the pin members so as to resist withdrawal of said pin members from the tubular members when in engagement therewith.

8. A coupling for adjacent tubular members of a pair of stacked tubular frames, each having an equal plurality of tubular members in fixed, spaced, substantially parallel relationship to each other, comprising: a body having a pair of elongated pin members secured together in end-to-end relationship, each of said pin members having a longitudinal axis and a plurality of radial longitudinal arcuate surfaces on a common circumference described about its longitudinal axis, the axis of one of said pin members being substantially parallel to the axis of the other of said pin members and transversely spaced therefrom, each of said pin members being insertable into one end of one of the adjacent tubular members, for coupling the tubular members, said body being rotatable so as to align the axes of said pin members with the axes of the tubular members.

9. A coupling, as defined in claim 8, wherein continued rotation of said coupling pin misaligns said axes so as to cause said arcuate surfaces to frictionally engage the inner surfaces of the tubular members for locking the tubular members together.

10. A coupling, as defined in claim 9, including means on said pin members and responsive to rotation of said pin members relative to the tubular members for gripping the internal surface of the tubular members, said means comprising longitudinally spaced teeth on said arcuate surfaces of said pin members.

11. A coupling, as defined in claim 10, wherein the radial dimensions of said common circumference of each of said pin members are equal for coupling tubular members of substantially equal diametrical dimensions having fixed, parallel, and transversely spaced axes.

12. A coupling, as defined in claim 10, wherein the radial dimension of said common circumference of one of said pin members is greater than the common circumference of the other said pin members for coupling tubular members of unequal diametrical dimension, each being substantially complementary in size to one of said pin members and having fixed, parallel, and transversely spaced axes.

References Cited in the file of this patent

UNITED STATES PATENTS

| | | |
|---|---|---|
| 958,751 | Lovett | May 24, 1910 |
| 1,174,858 | Hamilton | Mar. 7, 1916 |
| 2,144,310 | Hyland | Jan. 17, 1939 |
| 2,181,784 | Dugan et al. | Nov. 28, 1939 |
| 2,281,220 | Anderson | Apr. 28, 1942 |
| 2,347,534 | Anderson | Apr. 25, 1944 |
| 2,400,686 | Cox | May 21, 1946 |
| 2,508,668 | Gascoigne | May 23, 1950 |
| 2,920,894 | Kreinick | Jan. 12, 1960 |

FOREIGN PATENTS

| | | |
|---|---|---|
| 21,084 | Denmark | Mar. 2, 1916 |